United States Patent
Wirth

(10) Patent No.: US 9,273,573 B2
(45) Date of Patent: Mar. 1, 2016

(54) EXHAUST-GAS TREATMENT DEVICE

(75) Inventor: Georg Wirth, Kirchheim/Teck (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 96 days.

(21) Appl. No.: 13/978,916

(22) PCT Filed: Jan. 11, 2012

(86) PCT No.: PCT/EP2012/050342
§ 371 (c)(1),
(2), (4) Date: Jul. 10, 2013

(87) PCT Pub. No.: WO2012/095442
PCT Pub. Date: Jul. 19, 2012

(65) Prior Publication Data
US 2013/0276418 A1    Oct. 24, 2013

(30) Foreign Application Priority Data
Jan. 14, 2011 (DE) .................. 10 2011 002 681

(51) Int. Cl.
*B01D 46/00* (2006.01)
*F01N 3/02* (2006.01)
*F01N 3/28* (2006.01)

(52) U.S. Cl.
CPC ............ *F01N 3/0205* (2013.01); *F01N 3/2867* (2013.01); *F01N 3/2871* (2013.01); *F01N 3/2875* (2013.01)

(58) Field of Classification Search
CPC ... F01N 3/2051; F01N 3/2867; F01N 3/2871; F01N 3/2875; B01D 46/02; B01D 46/10; B01D 46/23; B01D 46/63; B01D 46/2407; B01D 46/4218

USPC ............ 55/490, 490.1, 385.3, 267, 282–283, 55/301, 466, 523, DIG. 10, DIG. 30; 422/168, 179; 428/469, 701–702; 96/146, 153; 95/148, 278, 283
See application file for complete search history.

(56) References Cited

U.S. PATENT DOCUMENTS 4,043,761 A * 8/1977 Gaysert et al. ................. 422/179
5,423,904 A * 6/1995 Dasgupta ........... B01D 46/0023
                                                          55/282

(Continued)

FOREIGN PATENT DOCUMENTS

DE           2407990 A1    8/1975
DE   10 2004 011 844 A1   10/2005

(Continued)

*Primary Examiner* — Robert Clemente
*Assistant Examiner* — Karla Hawkins
(74) *Attorney, Agent, or Firm* — McGlew and Tuttle, P.C.

(57) ABSTRACT

An exhaust-gas treatment device (1) for an exhaust gas system of an internal combustion engine, in particular of a motor vehicle, includes a housing (2), the jacket (3) of which encloses an accommodating space (5) in the circumferential direction, at least one exhaust-gas treatment element (6), which is arranged in the accommodating space (5), and a bearing layer (7) made of an elastic bearing material, which bearing layer encloses the at least one exhaust-gas treatment element (6) in the circumferential direction and which lies radially against at least one exhaust-gas treatment element (6). An insulating layer (8), made of a thermally insulating, deformation resistant/compression resistant insulating material, encloses the bearing layer (7) in the circumferential direction within the jacket (3).

20 Claims, 3 Drawing Sheets

(56) References Cited

U.S. PATENT DOCUMENTS

| | | | | |
|---|---|---|---|---|
| 6,013,118 A | * | 1/2000 | Matsunuma | B01D 46/002 55/282.3 |
| 2002/0038536 A1 | * | 4/2002 | Best | B01D 46/2448 55/282.3 |
| 2006/0019119 A1 | * | 1/2006 | Spitsberg et al. | 428/701 |
| 2009/0060800 A1 | * | 3/2009 | Fernandes, Jr. | 422/168 |
| 2009/0199521 A1 | * | 8/2009 | Witschen | F01N 3/2853 55/385.1 |
| 2012/0217251 A1 | * | 8/2012 | Handa | 220/562 |

FOREIGN PATENT DOCUMENTS

| | | |
|---|---|---|
| DE | 10 2008 048 314 A1 | 4/2010 |
| DE | 10 2009 012 892 A1 | 9/2010 |
| DE | 10 2009 014 433 A1 | 9/2010 |
| EP | 1 342 888 B1 | 3/2006 |
| EP | 2 151 551 A1 | 2/2010 |
| FR | 2 261 415 A1 | 9/1975 |

* cited by examiner

EXHAUST-GAS TREATMENT DEVICE

CROSS REFERENCE TO RELATED APPLICATIONS

This application is a United States National Phase Application of International Application PCT/EP2012/050342 filed Jan. 11, 2012 and claims the benefit of priority under 35 U.S.C. §119 of German Patent Application DE 10 2011 002 681.9 filed Jan. 14, 2011, the entire contents of which are incorporated herein by reference.

FIELD OF THE INVENTION

The present invention relates to an exhaust gas treatment device for an exhaust system of an internal combustion engine, in particular of a motor vehicle, having a housing, an exhaust gas treatment element arranged in an accommodation space within the housing, a bearing layer and an insulating layer.

BACKGROUND OF THE INVENTION

Usually, an exhaust gas treatment device such as for example a particle filter or a catalytic converter comprises a housing, the jacket of which encloses an accommodation space in circumferential direction, wherein in the accommodation space at least one exhaust gas treatment element is arranged, which can be for example a particle filter element or a catalyst element. Such exhaust gas treatment elements can for example have a ceramic basic body, which in particular can have a monolithic structure. Such ceramic exhaust gas treatment elements are comparatively sensitive to shock loads and must therefore be mounted in the housing or in the jacket in a shock-absorbing manner. Accordingly, a usual exhaust gas treatment device additionally comprises a bearing layer of an elastic bearing material, which encloses the respective exhaust gas treatment element in the circumferential direction.

Since such a bearing layer in conventional design additionally serves to fix the respective exhaust gas element in position in the housing, the respective exhaust gas treatment element and the housing jacket are crimped together with the bearing layer arranged between. The bearing materials used in this case are selected so that a desired holding force and the absorbing effect for the respective exhaust gas treatment element can be ensured throughout the usual temperature range of the exhaust gas treatment device. In this case, the bearing layer has to balance temperature expansion coefficients on the one hand of the metallic jacket and on the other hand of the ceramic exhaust gas treatment element.

In modern exhaust gas treatment devices, a thermal insulation can be additionally provided, which encloses the housing or the jacket on an outside in order to reduce the thermal load of the surroundings. Such a design however is disadvantageous in multiple respects. On the one hand, the insulation arranged on the outside of the jacket has to be fixed, which can for example be realized with a further metallic sleeve, which encloses the jacket. This design is comparatively involved and expensive. On the other hand, higher temperatures result for the jacket arranged radially between the insulation and the bearing layer, since the insulation located on the outside prevents cooling of the jacket. These higher temperatures in the jacket result in greater thermally-induced relative movements between the jacket and the respective exhaust gas treatment element, as a result of which the mounting of the respective exhaust gas treatment element is weakened. At the same time, a higher corrosion load results for the jacket. In order to remedy this, a more expensive material can be utilized for the jacket which has a higher corrosion resistance and/or a lower temperature expansion coefficient.

From DE 10 2008 048 314 A1 an exhaust gas treatment device for an exhaust system of an internal combustion engine is known, the housing of which comprises a jacket located inside, which encloses an accommodation space in the circumferential direction, and a jacket located outside, which encloses the jacket located inside and thus likewise which encloses an accommodation space in the circumferential direction. Furthermore, the exhaust gas treatment device comprises an exhaust gas treatment element, which is arranged in the accommodation space, as well as a bearing layer of an elastic bearing material, which encloses the exhaust gas treatment element in the circumferential direction, radially lies against said exhaust gas treatment element with a pressure force, transmitting this pressure force onto the jacket force located inside. Because of this, the exhaust gas treatment element is fixed in position relative to the jacket located inside. Furthermore, the known exhaust gas treatment device comprises an insulating layer of a thermally insulating insulating material, which encloses the jacket located inside and thus also the bearing layer and the exhaust gas treatment element in the circumferential direction within the jacket located outside. In this case, the insulating layer lies against the jacket located outside and is braced against the jacket located inside via webs so as to position it in the jacket located outside. In addition to this, the known exhaust gas treatment device is equipped with a metal foil, which is radially arranged between the bearing layer and the jacket located inside.

SUMMARY OF THE INVENTION

The present invention deals with the problem of providing an improved embodiment for an exhaust gas treatment device of the type mentioned at the outset, which is characterized in particular in that with adequate thermal insulation the comparatively cost-effective realizability can be achieved.

According to the invention, an exhaust gas treatment device is provided for an exhaust system of an internal combustion engine. The exhaust gas treatment device comprises a housing comprising a jacket which encloses an accommodation space in a circumferential direction, an exhaust gas treatment element arranged in the accommodation space, a bearing layer of an elastic bearing material, which encloses the exhaust gas treatment element in the circumferential direction and radially lies against the at least one exhaust gas treatment element and an insulating layer. The insulating layer comprises a thermally insulating, pressure-resistant (deformation resistant/yielding resistant—non yielding) insulating material, which encloses the bearing layer in the circumferential direction within the jacket. The insulating layer is configured to be pressure-resistant (deformation resistant/yielding resistant/compression resistant) and to transmit radially orientated pressure forces between the jacket and the bearing layer, which the bearing layer introduces onto the exhaust gas treatment element.

The present invention is based on the general idea of arranging an insulating layer radially between the bearing layer and the jacket, so that the insulating layer encloses the bearing layer in the circumferential direction and in particular lies directly or indirectly against the jacket. In this case it is important that the insulating layer consists of a thermally insulating and pressure-resistant (deformation resistant/ yielding resistant/compression resistant) insulating material.

By using a deformation resistant/compression resistant insulating material it is possible to transmit the radially orientated pressure forces which are required for fixing the at least one exhaust gas treatment element relative to the jacket, which pressure forces are introduced from the bearing layer onto the at least one exhaust gas treatment element, between the jacket and the bearing layer. Because of this, the pressure forces introduced from the bearing layer into the at least one exhaust gas treatment element are transmitted onto the jacket from the insulating layer directly or indirectly lying against the bearing layer. With the thermally-induced relative movements that occur between the jacket and the respective exhaust gas treatment element, which lead to a change of the radially measured gap width of the annular gap formed between the respective exhaust gas element and the jacket and accordingly are accompanied by the change of the pressure loading of the bearing layer and insulating layer arranged in this annular gap, the insulating layer is not substantially subjected to a change in shape because of its pressure stability. The insulation layer remains dimensionally stable. In contrast with the elastic bearing material, the deformation resistant/compression resistant insulating material does not, or does not substantially, change its shape with the pressures that usually occur. Thus, the gap change that occurs during operation substantially exclusively results in a deformation of the bearing layer, the bearing material of which is specifically selected in the usual manner so that it can elastically absorb such gap changes. The invention thus provides a functional separation between the thermal insulation with pressure bracing against the jacket on the one hand by means of the insulating layer and the elastic fixing of the respective exhaust gas treatment element with compensation of the thermally-induced expansion effects on the other hand by means of the bearing layer. Thus, disadvantageous interactions of an elastic thermal insulation can be avoided.

The expensive bearing material compared with a conventional, non-pressure-resistant insulation material, which can for example consist of a fibre mat, is characterized in that the deformation of the bearing material largely takes place elastically, while a comparable deformation of a conventional fibrous insulating material occurs plastically, at least partially. Thus, the use of a conventional, non-pressure-resistant bearing material in the annular gap is excluded, since the radial bracing between the respective exhaust gas treatment element and the jacket required for fixing the respective exhaust gas treatment element in position is clearly and permanently reduced as part of a gap change.

By using a deformation resistant/compression resistant insulating material proposed according to the invention, these disadvantages can be avoided. Gap changes are substantially exclusively compensated by the bearing material, namely largely elastically, so that no critical reduction of the preload occurs. Because of this it is possible to reduce the temperature of the jacket so that for the jacket more inexpensive materials can also be used.

The insulating layer can be braced either indirectly via an in particular flexible intermediate layer or directly on the bearing layer. The intermediate layer can for example be a preferentially flexible vapor barrier layer.

Additionally or alternatively, the insulating layer can be braced against the jacket either indirectly by an in particular flexible intermediate layer or directly. The intermediate layer can for example be a preferentially flexible vapor barrier layer.

According to an advantageous embodiment, a vapor barrier layer can be arranged radially between bearing layer and insulating layer, which encloses the bearing layer in the circumferential direction and radially lies against both the bearing layer as well as the insulating layer. With the help of such a vapor barrier layer, the insulating layer can be protected for example from moisture, which can occur in the exhaust gas treatment device through condensation. Such a condensate develops in particular during a cold starting phase of the exhaust system, when steam carried along in the exhaust gas condenses on cold surfaces of the exhaust system, in particular within such an exhaust gas treatment device. By using such a preferentially flexible vapor barrier layer it is possible for example to use an insulating material that is sensitive to vapor or moisture.

According to another advantageous embodiment, a vapor barrier layer can be arranged radially between insulating layer and jacket, which encloses the insulating layer in the circumferential direction and via which the insulating layer radially lies against the jacket. While the previously mentioned vapor barrier layer protects the insulating layer with respect to the bearing layer from steam, the no introduced vapor bearing layer protects the insulating layer with respect to the jacket from steam. For example, by using such a preferentially flexible vapor barrier layer the corrosion hazard for the jacket can be reduced, so that it is possible in principle to use a more inexpensive material and/or a reduced wall thickness for the jacket.

In principle, the insulating layer can be provided with such a vapor barrier layer each both radially inside as well as radially outside. Furthermore it is possible to completely envelope the insulating layer with such a vapor barrier layer, namely radially inside and outside as well as axially.

The respective vapor barrier layer can for example be a comparatively thin metal foil, which can have a wall thickness of 0.05 mm to 0.1 mm or up to 0.2 mm. Suitable for this for example is a light metal foil, in particular an aluminum foil, or a steel foil, in particular a stainless steel foil.

According to an advantageous embodiment, the insulating material can be a microporous solid material. Such microporous solid materials on the one hand have the required pressure resistance and on the other hand are characterized by a relatively high thermal insulating effect. With suitable material selection, such microporous solid materials also have an adequately high temperature resistance. Further suitable solid materials are for example lightweight refractory bricks, for example calcium silicate. Likewise, expanded mica or vermiculite can also be used.

In another embodiment it can be provided that the insulating layer is segmented in the circumferential direction and comprises a plurality of insulating bodies, which follow one another in the circumferential direction and extend over a circumferential section each. The use of such insulation bodies in the form of circumferential sections of the insulating layer simplifies the assembly or the attachment of the insulating layer on the bearing layer.

Practically, the insulating bodies adjacent in the circumferential direction can mutually overlap radially in the circumferential direction. Because of this, a radial leakage of exhaust gas and/or heat can be reduced. The adjacent insulating bodies in this case engage into one another in the manner of the tongue and groove principle.

In a further embodiment, the insulating bodies in their axial extension can each comprise at least one circumferential step, wherein the insulating bodies adjacent in the circumferential direction can axially overlap one another in the circumferential direction with these circumferential steps. In this way, an axial leakage of exhaust gas can be avoided. In addition, the overlap in the circumferential direction between adjacent insulating bodies results in a stabilisation of the insulating layer.

In the case that a vapor barrier layer which completely encloses the insulating layer is present, it can be practical to enclose the insulation bodies individually on their own in such a vapor barrier layer.

In another embodiment, the insulating layer or at least one of the insulating bodies can be fixed on the jacket axially and/or in circumferential direction. In this way, the assembly of the exhaust gas treatment device can be simplified, in particular the so-called canning, i.e. introducing the respective exhaust gas treatment element into the jacket. To this end, the jacket on the one hand is provided with the insulating layer, while on the other hand the respective exhaust gas treatment element is provided with the bearing layer. Upon assembly, the crimping of the bearing layer then takes place at the same time.

Fixing the insulating bodies or the insulating layer on the jacket can be realized with suitable fastening means, for example screws or rivets or glued connections can be employed. Alternatively, it is likewise possible to create frictionally-connected and/or positively-connected fixings between the insulating layer or the insulating bodies and the jacket, for example with the help of geometrical irregularities, such as for example dents, beads or shoulders.

According to a further embodiment, a protective ring can be arranged on at least one axial end of the insulating layer, which radially lies against the bearing layer and the jacket and axially against the insulating layer. With the help of such a protective ring the insulating layer can be protected from direct exposure to exhaust gas. In particular, the protective ring can be of a thermally insulating design. Additionally or alternatively, the protective ring can be designed as a vapor barrier. In particular, the protective ring can be produced from bearing material. Alternatively, it is also possible to press the protective ring from knit wire mesh, wherein optionally a ceramic filling can be provided.

According to a further embodiment, the jacket can comprise at least one annular step, which axially delimits an in particular annular insulating space and radially lies against the bearing layer, wherein the insulating layer is arranged in this insulating space.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
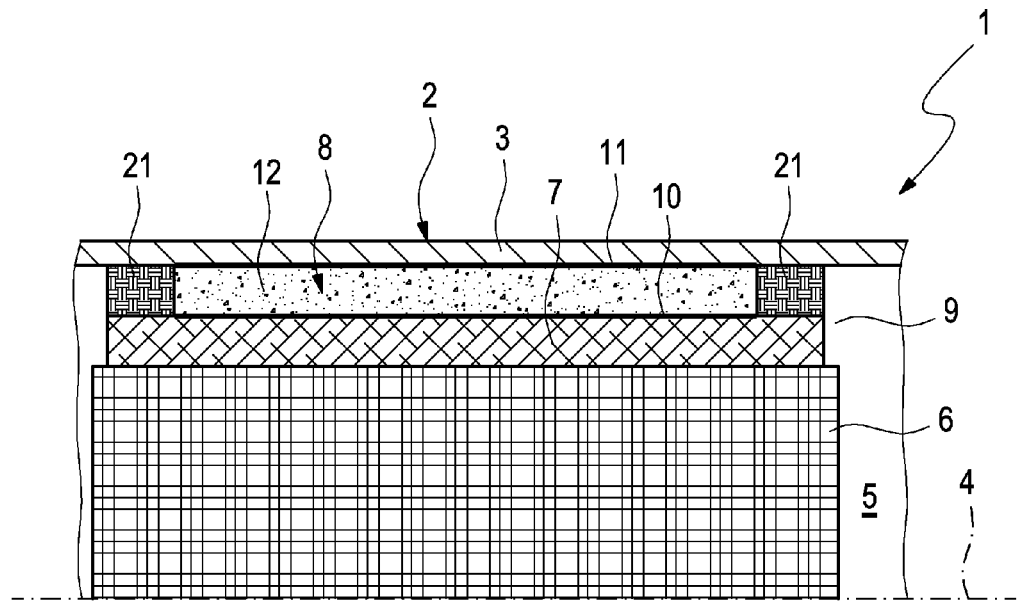
FIG. 1 is a greatly simplified schematic half longitudinal section of an exhaust gas treatment device according to an embodiment of the invention.

Referring to the drawings in particular, according to FIGS. 1 to 4, an exhaust gas treatment device 1, which can be used with an exhaust system of an internal combustion engine, in particular of a motor vehicle. The exhaust gas treatment device 1 comprises a housing 2, which comprises a jacket 3, which with respect to a longitudinal center axis 4, extends in a circumferential direction. Because of this, the jacket 3 encloses an accommodation space 5 in the circumferential direction. Furthermore, the exhaust gas treatment device 1 comprises at least one exhaust gas treatment element 6, which is arranged in the accommodation space 5. The respective exhaust system treatment element 6 can for example be produced from a ceramic material. In particular, the exhaust gas treatment element 6 can be a ceramic monolith. If the exhaust gas treatment device 1 is designed as a particle filter, the exhaust gas treatment element 6 is a particle filter element. If the exhaust gas treatment device 1 is designed as a catalytic converter, the exhaust gas treatment element 6 is a catalytic converter element. In principle, the exhaust gas treatment device 1 can contain a plurality of exhaust gas treatment elements 6, which can also be designed differently. Thus, a hydrolysis catalytic converter, an SCR-catalytic converter and an oxidation catalytic converter can be arranged in a common housing.

For storing the respective exhaust gas treatment element 6 in the jacket 3, the exhaust gas treatment device 1 additionally comprises a bearing layer 7 of an elastic (elastically deformable) bearing material. The bearing layer 7 encloses the respective exhaust gas treatment element 6 in the circumferential direction and radially lies against the exhaust gas treatment element 6. In order to reduce the outside temperature of the housing 2, in particular on the jacket 3, the exhaust gas treatment device 1 is additionally equipped with an insulating layer 8, which is formed from a thermally insulating, pressure-resistant (deformation resistant/yielding resistant—non yielding) insulating material. The insulating layer 8 encloses the bearing layer 7 in the circumferential direction and radially comes to lie directly or indirectly against the jacket 3. Radially between exhaust gas treatment element 6 and jacket 3, an annular gap 9 extending in the circumferential direction is provided, which is jointly filled out through the bearing layer 7 and the insulating layer 8.

Particularly practically, a vapor barrier layer 10 can be arranged between bearing layer 7 and insulating layer 8. This vapor insulating layer 10 encloses the bearing layer 7 in the circumferential direction. It radially lies against both the bearing layer 7 as well as the insulating layer 8. Additionally or alternatively to this vapor barrier layer 10, a vapor barrier layer 11 can also be arranged radially between the insulating layer 8 and the jacket 3. The two vapor barrier layers 10, 11, which can be present cumulatively or alternatively, are also designated inner vapor barrier layer 10 and outer vapor barrier layer 11, since the inner vapor barrier layer 10 is arranged on the insulating layer 8 radially inside while the outer vapor barrier layer 10 is arranged on the insulating layer 8 radially outside. The outer vapor barrier layer 11 encloses the insulating layer 8 in the circumferential direction and radially lies directly against both the jacket 3 as well as the insulating layer 8. It is likewise possible in principle to provide the insulating layer 8 with such a vapor barrier radially inside and radially outside as well as axially on both sides.

The insulating material, from which the insulating layer 8 is produced, is preferably a microporous solid material or expanded mica. Thermally insulating and heat-resistant, lightweight solid materials are for example found in furnace construction or in cooling systems.

Figure 3:
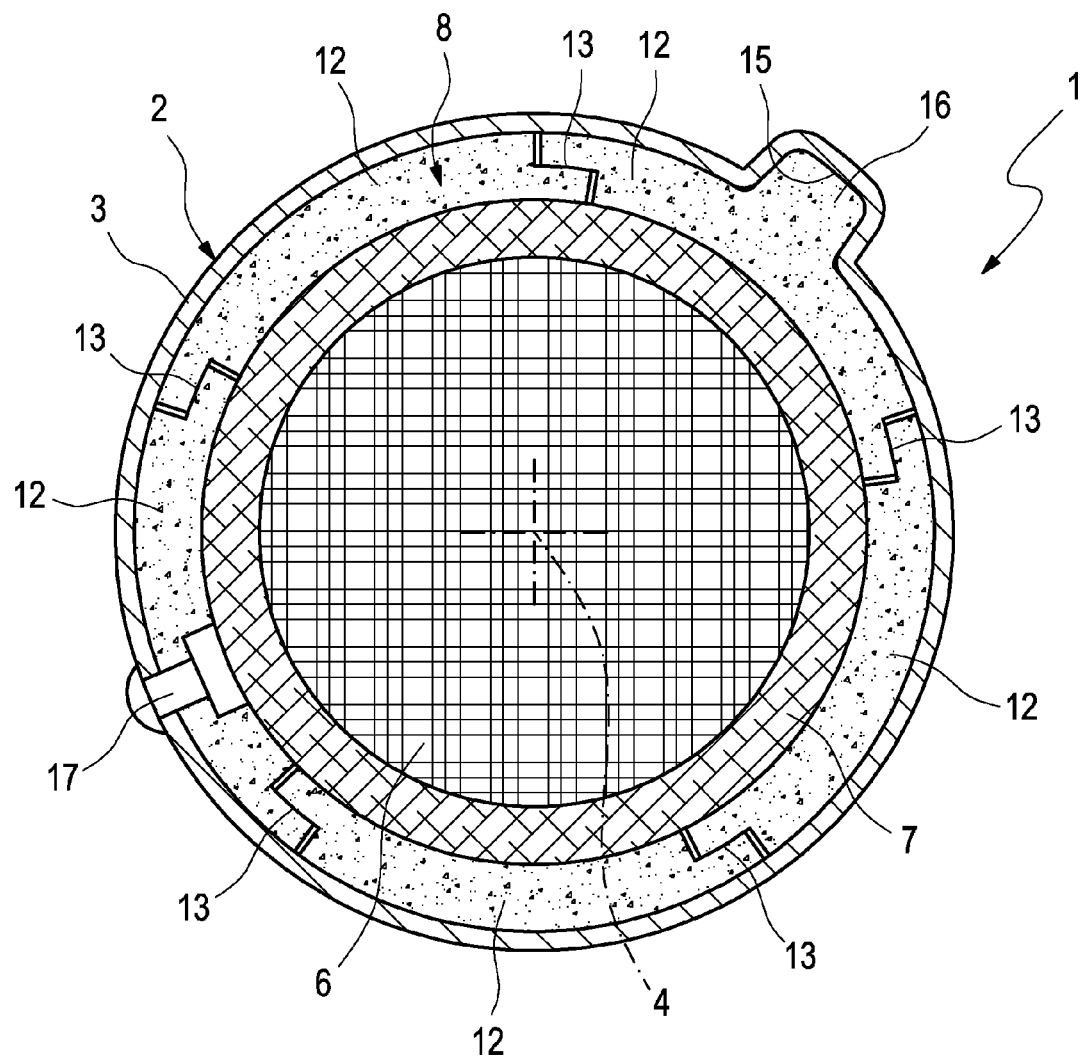
FIG. 3 is a cross sectional view of the exhaust gas treatment device of each of FIG. 1 and FIG. 2.
Figure 4:
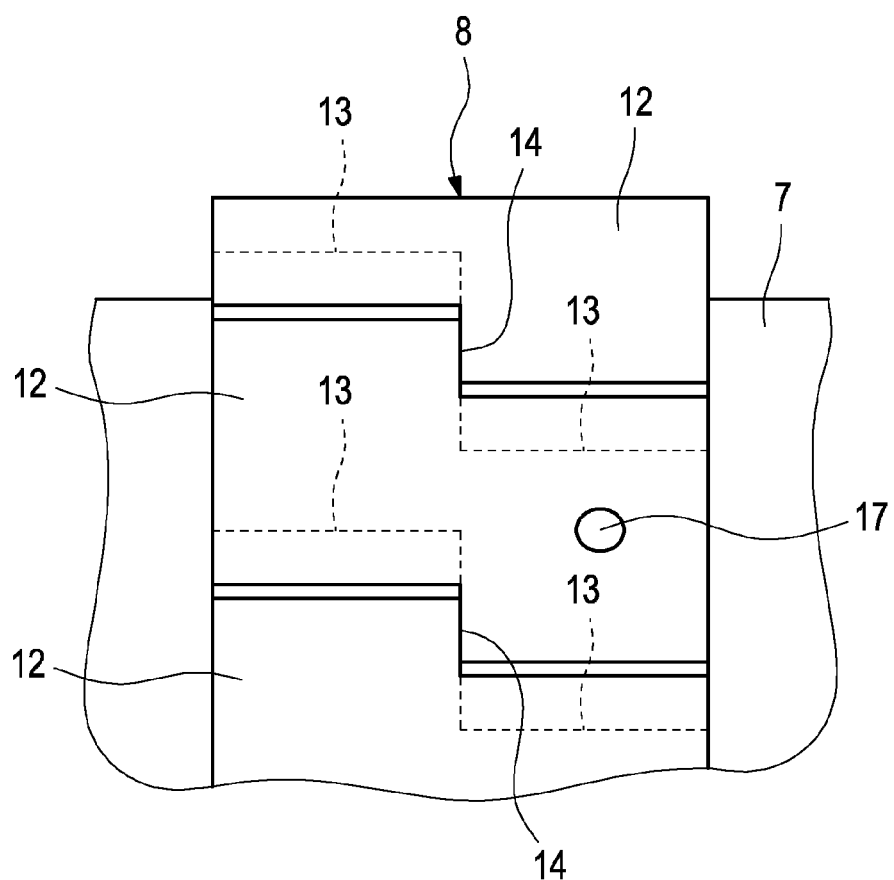
FIG. 4 is a lateral view of such an exhaust gas treatment device with omitted housing.

As is evident from FIGS. 3 and 4, the insulating layer 8, according to an advantageous embodiment, can consist of a plurality of insulating bodies 12, which follow one another in the circumferential direction. Because of this, a circumferential segmentation of the insulating layer 8 into the individual insulating bodies 12 is obtained. According to FIG. 3, the individual insulating bodies 12 can be stepped in shape in a region of their circumferential ends such that the insulating bodies 12 which are adjacent in the circumferential direction mutually overlap in the circumferential direction. Corresponding overlapping regions are designated 13 in FIG. 3. This produces a coupling in the manner of a tongue and groove principle.

According to FIG. 4, the insulating bodies 12 in their axial extension can comprise at least one circumferential step 14. These circumferential steps 14 are matched to one another such that the insulating bodies 12, which are adjacent in the circumferential direction, overlap with these circumferential steps 14 in the circumferential direction. In FIG. 4, an interrupted line indicates the overlap regions 13 from FIG. 3, so that the circumferential steps 14 can be combined with these overlap regions 13.

The insulating layer 8 or the individual insulating bodies 12 can be fixed to the jacket 3, namely axially and/or in circumferential direction. Such fixings can for example be realized by means of positive connections. In FIG. 3, a depression 15 formed on the inside of the jacket 3 is indicated, in which a protrusion 16 engages radially, which is moulded on one of the insulating bodies 12 on an outside. This produces a fixing at least in the circumferential direction by means of positive connection. Likewise, gluing between the insulating bodies 12 and the jacket 3 is conceivable in principle. Alternatively, fastening aids can also be used, such as for example screws 17 or rivets 17.

In order to be able to realize a vapor barrier also with the segmented insulating layer 8, it can be provided in particular to hermetically seal each insulating body 12 completely with a vapor barrier envelope. Alternatively, it can also be adequate with respect to the insulating layer 8 assembled from the insulating bodies 12 to arrange a vapor barrier layer 10 located inside and/or a vapor barrier layer 11 located outside.

Figure 2:
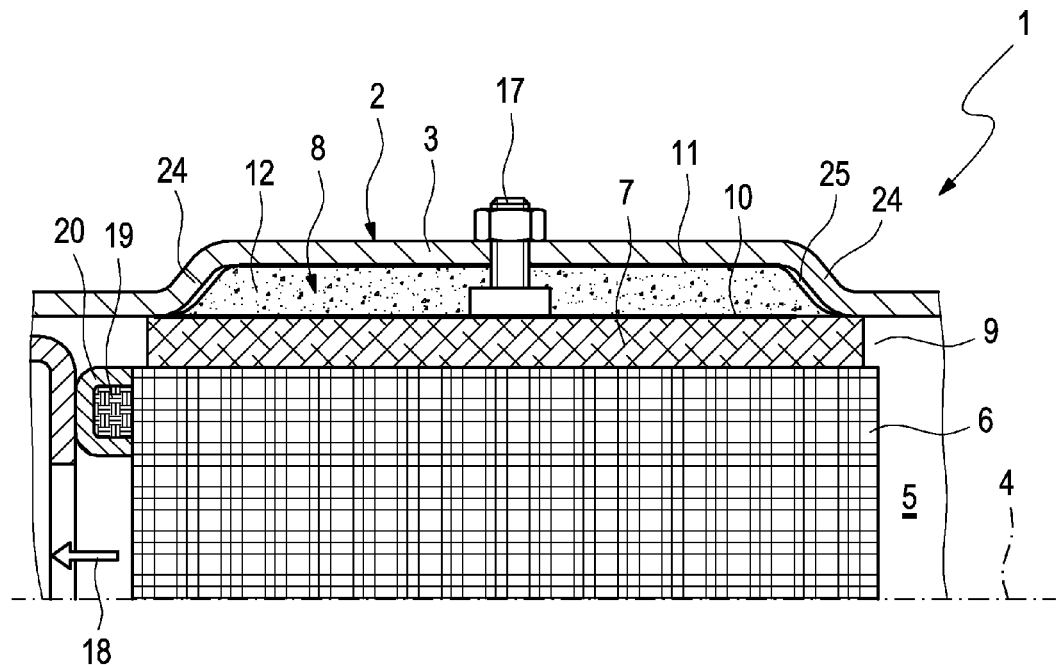
FIG. 2 is a greatly simplified schematic half longitudinal section of an exhaust gas treatment device according to another embodiment of the invention.

In the embodiment shown in FIG. 2, a screw connection 17 is again provided for fixing the respective insulating body 12 to the jacket 3. In FIG. 2, a flow direction of an exhaust gas flow 18 is additionally indicated by an arrow, which exhaust gas flow 18 flows through the exhaust gas treatment element 6 during the operation of the exhaust gas treatment device 1. In this direction, the exhaust gas flow 18 drives the exhaust gas treatment element 6. To axially support the exhaust gas element 6, a support ring 19 can be provided, which braces itself axially on the exhaust gas treatment element 6 and is fixed in a holder 20 relative to the housing 2.

According to FIG. 1, a protective ring 21 each can be provided on the axial ends of the insulating layer 8. The respective protective ring 21 radially lies against the jacket 3 on the outside, radially inside against the bearing layer 7 and axially against the insulating layer 8. The respective protective ring 21 is practically configured in a thermally insulating manner. It can include a vapor barrier. Furthermore, it can be produced from bearing material.

Figure 5:
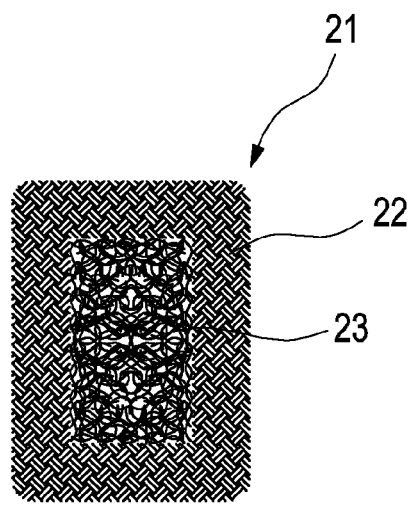
FIG. 5 is a simplified cross sectional view of a protective ring.

However, particularly advantageous is an embodiment shown in FIG. 5, in which the protective ring 21 is formed of a knit wire mesh 22 with ceramic fibre filling 23, which are crimped together. The knit wire mesh 22 has the required elasticity and the ceramic fibre filling 23 can create the desired thermal insulation. Likewise, the desired vapor barrier can be achieved through this.

FIG. 2 shows another embodiment, which manages to get by without such protective rings 21. In the embodiment shown in FIG. 2, the jacket 3 comprises two annular steps 24, which are dimensioned so that they axially delimit an insulation space 25 in which the insulating layer 8 is arranged, and that they radially come to lie against the bearing layer 7.

While specific embodiments of the invention have been shown and described in detail to illustrate the application of the principles of the invention, it will be understood that the invention may be embodied otherwise without departing from such principles.

The invention claimed is:

1. An exhaust gas treatment device for an exhaust system of an internal combustion engine, the exhaust gas treatment device comprising:
a housing comprising a jacket which encloses an accommodation space in a circumferential direction;
an exhaust gas treatment element arranged in the accommodation space;
a bearing layer of an elastic bearing material, which encloses the exhaust gas treatment element in the circumferential direction and radially lies against the exhaust gas treatment element; and
an insulating layer, of a thermally insulating, deformation resistant/compression resistant insulating material, which encloses the bearing layer in the circumferential direction within the jacket, the insulating layer being configured to be deformation resistant/compression resistant and to transmit radially orientated pressure forces between the jacket and the bearing layer, which the bearing layer introduces onto the exhaust gas treatment element, wherein the insulating layer comprises a plurality of insulating bodies, which follow one another in the circumferential direction and each of which extend over a circumferential portion.

2. The exhaust gas treatment device according to claim 1, wherein the insulating layer is indirectly braced on the bearing layer via a flexible intermediate layer or directly braced on the bearing layer.

3. The exhaust gas treatment device according to claim 1, wherein the insulating layer is braced either indirectly on the jacket via a flexible intermediate layer or directly braced on the jacket.

4. The exhaust gas treatment device according to claim 1, further comprising a vapor barrier layer wherein:
radially between the bearing layer and the insulating layer the vapor barrier layer is arranged; and
the vapor barrier layer encloses the bearing layer in a radial direction and radially lies against both the bearing layer as well as the insulating layer.

5. The exhaust gas treatment device according to claim 1, further comprising a vapor barrier layer wherein:
radially between the insulating layer and the jacket the vapor barrier layer is arranged;

the vapor barrier layer encloses the insulating layer in the circumferential direction; and via the vapor barrier layer, the insulating layer radially lies against the jacket.

6. The exhaust gas treatment device according to claim 1, wherein the insulating material is a microporous solid material.

7. The exhaust gas treatment device according to claim 1, wherein the insulating bodies, adjacent to each other in the circumferential direction, mutually overlap in the circumferential direction.

8. The exhaust gas treatment device according to claim 1, wherein the insulating bodies, in their axial extension, comprise at least one circumferential step, wherein the insulating bodies, adjacent to each other in the circumferential direction, overlap with the circumferential steps in the circumferential direction.

9. The exhaust gas treatment device according to claim 1, wherein the insulating layer is surrounded radially outside and inside with a vapor barrier layer.

10. The exhaust gas treatment device according to claim 1, wherein the insulating layer or at least one of the insulating bodies is fixed on the jacket axially and/or in circumferential direction.

11. The exhaust gas treatment device according to claim 1, further comprising a protective ring on at least one axial end of the insulating layer the protective ring lying radially against the bearing layer and on the jacket and axially against the insulating layer.

12. The exhaust gas treatment device according to claim 1, wherein the jacket comprises an annular step on at least one axial end of the insulating layer, which radially lies against the bearing layer.

13. An exhaust gas treatment device for an exhaust system of an internal combustion engine, the exhaust gas treatment device comprising:

a housing comprising a jacket which encloses an accommodation space in a circumferential direction;

an exhaust gas treatment element arranged in the accommodation space;

a bearing layer comprising elastically deformable bearing material extending about the exhaust gas treatment element in the circumferential direction within the jacket and bearing against a radial outer surface of the exhaust gas treatment element; and an insulating layer comprising thermally insulating and deformation resistant/compression resistant insulating material extending about the bearing layer in the circumferential direction within the jacket, the insulating layer transmitting forces with a radial direction component between the jacket and the bearing layer, which the bearing layer introduces onto the exhaust gas treatment element, the insulating layer comprising a plurality of insulating bodies, which follow one another in the circumferential direction and each of which extend over a circumferential portion.

14. The exhaust gas treatment device according to claim 13, wherein:

thermally-induced relative movements occur between the jacket and the exhaust gas treatment element, which lead to a change of a radial distance of an annular gap formed between the respective exhaust gas element and the jacket accompanied by a change of radial forces on the bearing layer and on the insulating layer arranged in the annular gap; and the insulating layer remains dimensionally stable upon the change of the radially measured gap width of the annular gap and the change of the radially measured gap width of the annular gap substantially exclusively results in a deformation of the bearing layer.

15. The exhaust gas treatment device according to claim 14, further comprising a flexible intermediate layer wherein the insulating layer is indirectly braced on the bearing layer via the flexible intermediate layer wherein:

the flexible intermediate layer is a vapor barrier layer; and the vapor barrier layer encloses the bearing layer in a radial direction and radially lies against both the bearing layer as well as the insulating layer.

16. The exhaust gas treatment device according to claim 13, further comprising a flexible intermediate layer wherein the insulating layer is indirectly braced on the jacket via the flexible intermediate layer, wherein the insulating bodies, that are adjacent to each other in the circumferential direction, mutually overlap in the circumferential direction.

17. The exhaust gas treatment device according to claim 16, wherein:

the flexible intermediate layer is a vapor barrier layer;

the vapor barrier layer encloses the insulating layer in the circumferential direction; and via the vapor barrier layer, the insulating layer radially lies against the jacket.

18. The exhaust gas treatment device according to claim 13, wherein the insulating material is a microporous solid material.

19. An exhaust gas treatment device for an exhaust system of an internal combustion engine, the exhaust gas treatment device comprising:

a housing comprising a jacket which encloses an accommodation space in a circumferential direction;

an exhaust gas treatment element arranged in the accommodation space;

a bearing layer comprising elastically deformable bearing material extending about the exhaust gas treatment element in the circumferential direction within the jacket and bearing against a radial outer surface of the exhaust gas treatment element; and an insulating layer comprising thermally insulating and deformation resistant/compression resistant insulating material extending about the bearing layer in the circumferential direction within the jacket, the insulating layer transmitting forces with a radial direction component between the jacket and the bearing layer, which the bearing layer introduces onto the exhaust gas treatment element, said insulating layer comprising a plurality of insulating bodies, each of said insulating bodies being arranged adjacent to another one of said insulating bodies in the circumferential direction, wherein each of said insulating bodies extends in the circumferential direction.

20. The exhaust gas treatment device according to claim 19, wherein the insulating bodies, that are adjacent to each other in the circumferential direction, mutually overlap in the circumferential direction, each of said insulating bodies being arranged opposite a circumferential portion of said bearing layer, each end portion of one of said insulating bodies being located adjacent another end portion of another one of said insulating bodies in the circumferential direction.

* * * * *